(12) United States Patent
Ibaraki et al.

(10) Patent No.: US 9,003,791 B2
(45) Date of Patent: Apr. 14, 2015

(54) HOUSING STRUCTURE OF EXHAUST GAS TURBOCHARGER

(75) Inventors: Seiichi Ibaraki, Tokyo (JP); Takashi Shiraishi, Tokyo (JP); Hiroshi Suzuki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/642,947

(22) PCT Filed: Dec. 16, 2011

(86) PCT No.: PCT/JP2011/079153
§ 371 (c)(1),
(2), (4) Date: Jan. 14, 2013

(87) PCT Pub. No.: WO2012/090723
PCT Pub. Date: Jul. 5, 2012

(65) Prior Publication Data
US 2013/0266436 A1 Oct. 10, 2013

(30) Foreign Application Priority Data

Dec. 28, 2010 (JP) ................................. 2010-292865

(51) Int. Cl.
*F02B 33/44* (2006.01)
*F02D 23/00* (2006.01)
(Continued)

(52) U.S. Cl.
CPC ............. *F01D 25/24* (2013.01); *F01M 13/021* (2013.01); *F02M 25/0707* (2013.01); *F02M 25/0722* (2013.01); *F04D 29/4213* (2013.01); *F04D 29/681* (2013.01); *F05D 2220/40* (2013.01);
(Continued)

(58) Field of Classification Search
USPC .............. 60/605.2; 415/57.1, 57.3–4, 58.2–4, 415/914; 123/568.17
See application file for complete search history.

(56) References Cited

U.S. PATENT DOCUMENTS 3,462,071 A * 8/1969 Garve ........................... 415/116
3,741,676 A * 6/1973 Silvern et al. ................ 415/58.1
(Continued)

FOREIGN PATENT DOCUMENTS

DE    752 9221 U    11/1977
DE    4213047 A1 * 10/1993 ............... F04D 29/42
(Continued)

OTHER PUBLICATIONS

Official Translation of DE 4213047 A1.*
(Continued)

*Primary Examiner* — Thomas Denion
*Assistant Examiner* — Jessica Kebea
(74) *Attorney, Agent, or Firm* — Birch, Stewart, Kolasch & Birch, LLP

(57) ABSTRACT

A casing treatment 4 including a recirculation passage 41 and a mixing piping 6 are provided. The recirculation passage 41 has a first recirculation opening 42 and a second recirculation opening 43 that are in communication with each other, the first recirculation opening 42 being formed inside a compressor housing 11 of an exhaust gas turbocharger and opening to an air passage 15 upstream of a compressor impeller 3, the second recirculation opening 43 being formed at the outer circumferential section of the compressor impeller 3. The mixing pipe 6 opens to the recirculation passage 41 and has a return opening 14 for introducing EGR gas and blow-by gas to the recirculation passage 41.

5 Claims, 5 Drawing Sheets

(51) Int. Cl.

| | | |
|---|---|---|
| F02M 25/06 | (2006.01) | |
| F02M 25/07 | (2006.01) | |
| F01D 1/12 | (2006.01) | |
| F01D 5/04 | (2006.01) | |
| F01D 25/24 | (2006.01) | |
| F01M 13/02 | (2006.01) | |
| F04D 29/42 | (2006.01) | |
| F04D 29/68 | (2006.01) | |
| F02C 3/34 | (2006.01) | |

(52) U.S. Cl.
CPC ....... *F05D 2260/96* (2013.01); *F05D 2270/101* (2013.01); *Y02T 10/121* (2013.01); *F02C 3/34* (2013.01); *F05D 2270/082* (2013.01); *F01M 2013/027* (2013.01); *F02M 25/0712* (2013.01); *F04D 29/685* (2013.01); *Y10S 415/914* (2013.01)

(56) References Cited

U.S. PATENT DOCUMENTS

| | | | | |
|---|---|---|---|---|
| 3,976,390 | A * | 8/1976 | Silvern et al. | 415/58.1 |
| 4,930,978 | A * | 6/1990 | Khanna et al. | 415/58.3 |
| 5,327,725 | A | 7/1994 | Mitsubori | |
| 5,333,990 | A * | 8/1994 | Foerster et al. | 415/58.4 |
| 6,026,791 | A * | 2/2000 | Arnold | 123/568.27 |
| 6,813,887 | B2 * | 11/2004 | Sumser et al. | 60/611 |
| 7,021,058 | B2 * | 4/2006 | Scheinert | 60/611 |
| 7,025,557 | B2 * | 4/2006 | Japikse et al. | 415/1 |
| 7,204,241 | B2 * | 4/2007 | Thompson et al. | 123/572 |
| 7,444,814 | B2 * | 11/2008 | Sumser | 60/601 |
| 7,698,894 | B2 * | 4/2010 | Wood et al. | 60/605.2 |
| 8,287,232 | B2 * | 10/2012 | Gu et al. | 415/56.5 |
| 8,322,138 | B2 * | 12/2012 | Jackson | 60/605.1 |
| 2001/0028839 | A1 | 10/2001 | Nakao | |
| 2003/0131596 | A1 * | 7/2003 | Sumser et al. | 60/611 |
| 2006/0045764 | A1 * | 3/2006 | Thompson et al. | 417/313 |
| 2007/0144170 | A1 * | 6/2007 | Griffith | 60/600 |
| 2008/0134678 | A1 * | 6/2008 | Noelle et al. | 60/605.2 |
| 2008/0232952 | A1 * | 9/2008 | Gu et al. | 415/11 |
| 2008/0267765 | A1 * | 10/2008 | Chen | 415/58.4 |
| 2010/0150698 | A1 * | 6/2010 | Wood et al. | 415/58.2 |
| 2011/0214421 | A1 * | 9/2011 | Schmitt et al. | 60/605.2 |
| 2012/0297768 | A1 * | 11/2012 | Lischer | 60/605.2 |

FOREIGN PATENT DOCUMENTS

| | | | |
|---|---|---|---|
| DE | 103 21 572 A1 | 12/2004 | |
| DE | 102011109704 A1 * | 2/2013 | |
| DE | 102012200866 A1 * | 7/2013 | |
| JP | 6-74101 A | 3/1994 | |
| JP | 10-184371 A | 7/1998 | |
| JP | 2000-64848 A | 2/2000 | |
| JP | 2001-289197 A | 10/2001 | |
| JP | 2006-500515 A | 1/2006 | |
| JP | 2006-300078 A | 11/2006 | |
| JP | 2008-309125 A | 12/2008 | |
| JP | 2009-13814 A | 1/2009 | |
| JP | 200913814 A * | 1/2009 | ............. F02B 39/00 |
| JP | 2009-41551 A | 2/2009 | |
| JP | 2009-524774 A | 7/2009 | |
| JP | 2010-77833 A | 4/2010 | |
| JP | 2010-90806 A | 4/2010 | |
| JP | 2010-518298 A | 5/2010 | |
| JP | 2012062822 A * | 3/2012 | |
| WO | 2010/059447 A2 | 5/2010 | |
| WO | WO 2012146344 A1 * | 11/2012 | |

OTHER PUBLICATIONS

Extended European Search Report for European Patent Application No. 11852939.5 dated Nov. 6, 2013 in English language.

Chinese Notice of Allowance for corresponding Chinese Application No. 201180031898.3 dated Jul. 1, 2014 (with English translation).

\* cited by examiner

AT LOW FLOW RATE

AT HIGH FLOW RATE

HOUSING STRUCTURE OF EXHAUST GAS TURBOCHARGER

FIELD OF THE INVENTION

The present invention relates to a structure of a housing for an exhaust gas turbocharger, which is used for a diesel engine, equipped with an exhaust gas turbocharger and which recirculate exhaust gas.

DESCRIPTION OF THE RELATED ART

NOx emission regulations in an engine for an automobile and the like have become strict.

As for a diesel engine (hereinafter referred to as "engine"), exhaust gas recirculation (hereinafter referred to as "EGR") for recirculating a part of exhaust gas to the engine is performed to reduce NOx in the exhaust gas. The EGR gas is recirculated to an upstream side of a compressor impeller of the turbocharger where the pressure is low so as to perform EGR even at high boost pressure of the engine.

Further, unburned gas (hereinafter referred to as "blow-by gas") slipping through a space between a piston and a cylinder of the engine accumulates in a crankcase. To prevent the pressure of the crankcase from increasing, the blow-by gas is recirculated to the upstream side of the compressor impeller in the same manner as the EGR gas.

FIG. 8 is an illustration of an example of JP 2010-77833A (Patent Literature 1) in which the EGR gas is introduced to an air passage disposed upstream of the compressor impeller.

FIG. 8 shows a subsidiary intake passage 021 diverging from a main intake passage 011. The subsidiary intake passage 021 is connected to a second cylindrical part 06ac of a gas-liquid separator 06 along an inner circumference of the second cylindrical part 06ac.

Thus, the EGR gas entering the gas-liquid separator 06 from the subsidiary intake passage 021 flows through the second cylindrical part 06ac of the gas-liquid separator 06 and the inner circumferential surface of a first cylindrical part 06ab thereby generating turning force along the inner surface.

The flow of the EGR gas having the turning force joins the air (atmospheric air) introduced from the main intake passage 011, thereby applying the turning force to the air. Then a mixture of the EGR gas and the air generates a turning flow along the inner circumferential surface of the second cylindrical part 06ac and the first cylindrical part 06ab.

CITATION LIST

Patent Literature

[PTL 1]
JP 2010-77833 A

SUMMARY OF THE INVENTION

Technical Problem

According to the technique of Patent Literature 1, the mixed gas is introduced to the air passage on the upstream side of a compressor wheel 02c and the drifted mixed gas is drawn into the compressor wheel 02c and the flow resistance of the mixed gas increases. This could result in performance drop of the compressor.

In view of the above issues, an object of the present invention is to reduce interference of the main stream (air) streaming in the air passage when the EGR gas and the blow-by gas flows in by introducing the EGR gas and the blow-by gas to the air passage upstream of the compressor impeller via a casing treatment disposed circumferentially outside of the compressor impeller, and to secure high efficiency of the compressor and an approximate mixture of the EGR gas and a main stream of the blow-by gas (air) by reducing the pressure loss and suppressing strain in a flow velocity distribution upstream of the compressor impeller.

Solution to Problem

To solve the above issues, the present invention provides a housing structure for an exhaust gas turbocharger whose compressor impeller is housed in the housing structure. The housing structure comprises a casing treatment and a mixing pipe. The casing treatment comprises a recirculation passage which is annularly formed in a circumferential direction at an outer circumferential section of the compressor impeller, the recirculation passage having a first recirculation opening and a second recirculation opening that are in communication with each other, the first recirculation opening being formed inside the housing and opening to an air passage upstream of the compressor impeller, the second recirculation opening being formed in the air passage at the outer circumferential section of the compressor impeller. The mixing pipe opens to the recirculation passage and has a return opening for introducing at least one of EGR gas or blow-by gas to the recirculation passage.

With the above structure, with use of the recirculation passage as a chamber, it is possible to make the flow velocity distribution even and to achieve high efficiency of the compressor by suppressing interference of EGR gas and blow-by gas with the main flow of the air flowing in the air passage.

Further, with use of the recirculation passage as a chamber, it is possible to equalize the flow distribution of EGR gas and blow-by gas in the circumferential direction and also to easily increase a mix rate.

When the main flow of the air flows at a low flow rate (when the engine output is low/medium), it is possible to reduce the pressure loss caused by the interference of the EGR gas and blow-by gas with the main flow of the air flowing in the air passage 15 as the exhaust gas and the blow-by gas collects temporarily inside the recirculation passage.

In contrast, when the main flow of the air flows at a high flow rate (when the engine output is high), it is possible to introduce the EGR gas and blow-by gas into the compressor impeller having low pressure from the second recirculation opening 43, thereby achieving an effective exhaust gas purification.

According to the present invention, an opening part of the first recirculation opening facing the air passage may incline toward a leading edge of the compressor impeller.

With this structure, it is possible to achieve high efficiency of the compressor by reducing interference of EGR gas and blow-by gas with the main flow of the air flowing in the air passage and also by reducing the pressure loss and suppressing distortion in a flow velocity distribution upstream of the compressor impeller.

According to the present invention, a chamber may be provided in communication with the recirculation passage of the casing treatment via a communication passage, and the return opening introducing to the recirculation passage may be arranged in the chamber.

With the above structure, by bringing the casing treatment and the chamber in communication, it is possible to make the flow velocity distribution even in the circumferential direction of the EGR gas and blow-by gas and to increase the mixture rate.

Further, impurities contained in the exhaust gas and the blow-by gas, such as oil and soot can be removed and collected in the chamber and thus contamination of the compressor impeller can be prevented.

Further according to the present invention, the first recirculation opening and one of the return opening and the communication passage may be arranged approximately in alignment with the air passage so as to smoothly introduce the EGR gas or the blow-by gas to the air passage.

With this structure, by arranging the first recirculation opening and one of the return opening and the communication passage approximately in alignment with the air passage, at the small flow rate of the main flow of the air (when the output of the engine is medium or low), which is a frequent case, turbulence hardly occurs in a flow of the exhaust gas and the blow-by gas inside the chamber and the recirculation passage. Thus, the exhaust gas and the blow-by gas is smoothly mixed to the main flow of the air and the pressure loss is reduced.

Furthermore, according to the present invention, a chamber and a third recirculation opening may be provided, the chamber having a communication passage in communication with the recirculation passage of the casing treatment, the third recirculation opening communication with the chamber and having an opening part on an upstream side of the first recirculation opening in the air passage, the opening part being disposed approximately parallel to the first recirculation opening and inclining toward a leading edge of the compressor impeller.

With the above structure, when the main flow of the air flows at a high flow rate (when the engine output is high), it is possible to introduce the EGR gas and blow-by gas to the main flow of the air from first and third recirculation openings and also to the compressor impeller having low pressure from the second recirculation opening. As a result, an appropriate amount of EGR gas is introduced and effective exhaust gas purification is achieved.

Advantageous Effects

With use of the recirculation passage as a chamber, it is possible to make the flow velocity distribution uniform and to achieve high efficiency of the compressor by suppressing interference of the exhaust mixture gas with the main flow of the air flowing in the air passage.

Further, with use of the recirculation passage as a chamber, it is possible to equalize the flow distribution of the EGR gas and blow-by gas in the circumferential direction and also to increase a mix rate, hence providing an effective measure against NOx.

DETAILED DESCRIPTION OF THE INVENTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.
(First Embodiment)

Figure 1:
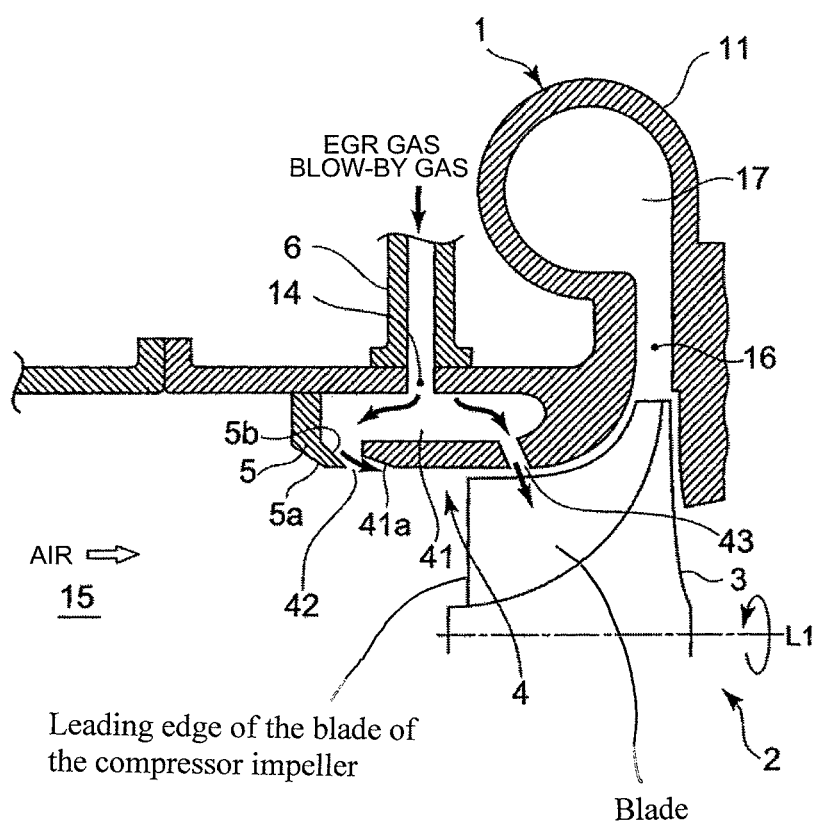
FIG. 1 is an enlarged sectional view of a rotation shaft of a compressor impeller showing a main section of an upper half thereof in an exhaust gas turbocharger according to a first embodiment of the present invention.

FIG. 1 is an enlarged sectional view of a rotation shaft of a compressor impeller showing a main section of an upper half thereof in an exhaust gas turbocharger according to a first embodiment of the present invention.

In FIG. 1, a compressor 1 is configured such that a turbine rotor 2 has a compressor impeller 3 fixed to one end for compressing intake air and a turbine wheel (not shown) fixed to the other end and rotated by exhaust gas. The compressor impeller 3 and the turbine wheel are coaxially coupled and rotate around an axis line L1 of the turbine rotor 2. An air passage 15 is formed on an air-inlet side of the compressor impeller 3 inside a compressor housing 11.

Further, a diffuser section 16 is formed at an outlet of the compressor impeller 3 inside the compressor housing 11.

A casing treatment 4 is formed with a recirculation passage 41 which is annularly formed at an outer circumferential section of the compressor impeller 3 inside the compressor housing 11. A first recirculation opening 42 connects the recirculation passage 41 and the air passage 15 at an inlet of the compressor impeller 3. A second recirculation opening 43 connects the recirculation passage 41 and an air passage at an outer circumferential section of the compressor impeller 3.

A plurality of the first recirculation openings 42 and the second recirculation opening 43 may be arranged along a circumferential direction of the annular recirculation passage 41 at equal intervals, or the first recirculation opening 42 and the second recirculation opening 43 of slit-like shape may be formed along the circumferential direction of the annular recirculation passage 41.

A recirculation-passage forming member 5 is detachably attached to a front end surface of an outer circumferential part of the air passage 15 at an inlet of the compressor 1 of the compressor housing 11.

The first recirculation opening 42 of the recirculation passage 41 is formed by an inner circumferential surface 5b of the recirculation-passage forming member 5 and an inner circumferential surface 41a of the compressor housing 11.

The first recirculation opening 42 forms a passage for exhaust mixture gas by the recirculation-passage forming member 5 and the inner circumferential surface 41a of the compressor housing 11.

An opening part of the first recirculation opening 42 inclines toward a leading edge of the compressor impeller 3 so that the inner circumferential surface 5b of the recirculation-passage forming member 5 and the inner circumferential surface 41a of the compressor housing 11 both face toward the leading edge of the compressor impeller 3.

The recirculation passage forming member 5 is configured such that an outer circumferential guide surface 5a facing the air passage 15 at the inlet of the compressor 1 inclines linearly.

In this embodiment, the outer circumferential guide surface 5a is formed into a linear inclined surface. However, this is not limitative and the outer circumferential guide surface 5a may be formed into a smooth curved surface so that the air flows more smoothly in the air passage 15.

By forming the recirculation passage forming member 5 so that the intake air flows smoothly along its surface facing the air passage 15 at the inlet of the compressor 3, resistance is reduced in the outer circumferential part of the air passage 15 at the inlet of the compressor impeller 3. As a result, it is possible to reduce the pressure loss in the part.

At an outer periphery of the recirculation passage 41, a return opening 14 is formed for introducing EGR gas and/or blow-by gas (hereinafter together referred to as "exhaust mixture gas") toward the air passage 15 via a mixing pipe 6.

The exhaust mixture gas introduced by the mixing pipe 6 flows in the annular recirculation passage 41 along the outer circumference of the air passage 15 and spreads throughout the recirculation passage 41.

A plurality of the return openings 14 may be provided at equal intervals along a circumferential direction of the annular recirculation passage 41.

In the first embodiment, rotation of the turbine rotor (not shown) rotates the compressor impeller 3 of the turbine rotor 2 and then the compressor impeller 3 draws in air through the air passage 15 of the compressor inlet and pressurizes the air. Further, the pressurized air is fed through the diffuser section 16 and a scroll section 17 and then to the engine.

Figure 2A:
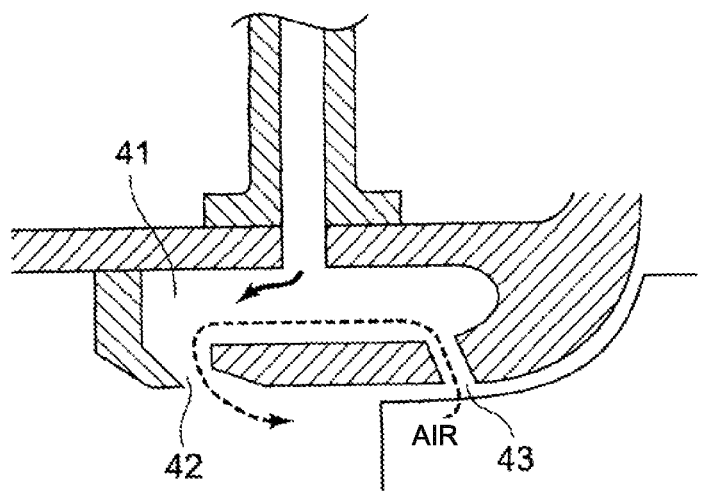
FIG. 2A is an illustration of an air flow flowing in a recirculation passage at a low flow rate according to the first embodiment of the present invention.

FIG. 2A is an illustration of the air flow flowing in the recirculation passage 41 at a low flow rate according to the first embodiment of the present invention.

When a main flow of the intake air flowing in the air passage 15 is small, i.e. at a low flow rate (when the output of the engine is medium or low), the pressure inside the compressor impeller 3 is higher than the pressure of the air passage. Thus, the exhaust mixture gas of the recirculation passage 41 is drawn into the main flow in the air passage 15 through the first recirculation opening 42.

Figure 2B:
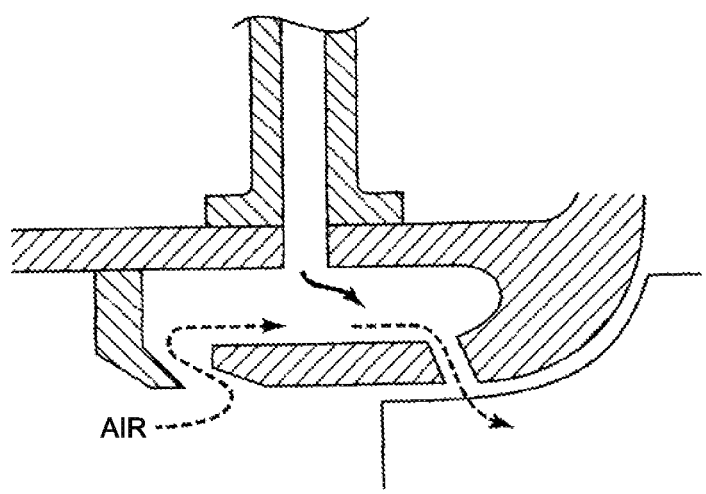
FIG. 2B is an illustration of the air flow flowing in the recirculation passage at a high flow rate according to the first embodiment of the present invention.

As a result the pressure in the recirculation passage 41 drops and hence the exhaust mixture gas is introduced from the return openings 14 and the air in the compressor impeller 3 is introduced from the second recirculation opening. The exhaust mixture gas enters the air passage 15, with small pressure loss, with the recirculation air from the first recirculation opening FIG. 2B is an illustration of the air flow flowing in the recirculation passage 41 at a high flow rate according to the first embodiment of the present invention.

When the main flow of the intake air flowing in the air passage 15 is large, i.e. at a high flow rate (when the output of the engine is high), the air flows in the air passage 15 at a high speed and the pressure inside the compressor impeller 3 is low. The exhaust mixture gas in the recirculation passage 41 is drawn into the main flow of the air passage 15 from the first recirculation opening 42 and also into the compressor impeller 3 from the second recirculation opening 43.

As a result, when the main flow of the intake air flowing in the air passage 15 is large, the exhaust mixture gas is introduced to the main flow from the first recirculation opening 42 and the second recirculation opening 42. Thus, a mixture ratio of the exhaust mixture gas to the main flow increases so that the exhaust mixture for NOx reduction does not become low.

According to the first embodiment, the recirculation passage 41 is used as a chamber and the opening part of the first recirculation opening 42 inclines toward the leading edge of the compressor impeller 3. Thus, it is possible to make the flow velocity distribution uniform and to achieve high efficiency of the compressor by suppressing interference of the exhaust mixture gas with the main flow of the air flowing in the air passage 15.

Further, with use of the recirculation passage 41 as a chamber, it is possible to equalize the flow distribution of the exhaust mixture gas in the circumferential direction and also to increase a mix rate.

When the main flow of the air flows at a low flow rate, it is possible to reduce the pressure loss caused by the interference of the exhaust mixture gas with the main flow of the air flowing in the air passage 15 by a chamber effect of the recirculation passage 41.

In contrast, when the main flow of the air flows at a high flow rate, it is possible to introduce the exhaust mixture gas into the compressor impeller 3 having low pressure from the second recirculation opening 43, thereby achieving an effective exhaust purification.

(Second Embodiment)

Figure 3:
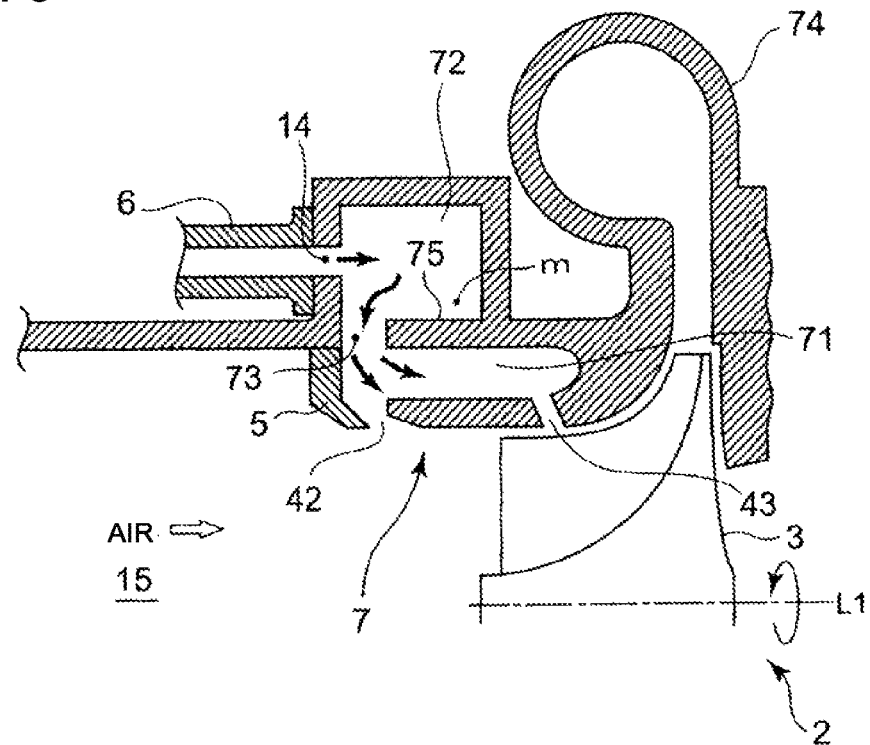
FIG. 3 is a view corresponding to FIG. 1 according to a second embodiment of the present invention.

In the following embodiment, components already described with reference to the first embodiment are denoted by the same reference numerals, and thus detailed description thereof will be hereinafter omitted. FIG. 3 is an enlarged sectional view of the rotation shaft of the compressor impeller showing a main section of an upper half thereof according to the second embodiment of the present invention.

A casing treatment 7 is formed with a recirculation passage 71 which is annularly formed at an outer circumferential section of the compressor impeller 3 inside a compressor housing 74. A first recirculation opening 42 connects the recirculation passage 71 and the air passage 15 at an inlet of the compressor impeller 3. A second recirculation opening 43 connects the recirculation passage 71 and an air passage at an outer circumferential section of the compressor impeller 3.

A plurality of the first recirculation openings 42 and the second recirculation opening 43 may be arranged at equal intervals or the first recirculation opening 42 and the second recirculation opening 43 of slit-like shape may be formed along a circumferential direction of the annular recirculation passage 71.

An annular chamber 72 is formed on an outer circumferential side of the annular recirculation passage 71. The annular chamber 72 is partitioned by a wall 75 outward from an outer circumferential wall forming the air passage 15.

The recirculation passage 71 and the chamber 72 are in communication with each other via a communication passage 73. The communication passage 73 is formed on the outer periphery of the recirculation passage 71 at an upstream end in the direction of the air flow flowing in the air passage 15. The communication passage 73 and the first recirculation opening of the recirculation passage 71 may be substantially in alignment in a radial direction with respect to the axial line L1 of the turbine rotor 2.

A plurality of the communication passages 73 may be provided circumferentially along the annular chamber 72 at equal intervals.

Further, the mixing pipe 6 is arranged to the annular chamber 72 to introduce the exhaust mixture gas into the chamber 72 via the return opening 14.

The rest of the structure is substantially the same as the first embodiment and thus not further explained.

According to the second embodiment, by communication the communication passage 71 and the chamber 72 via the communication passage 73, the exhaust mixture gas is further equalized in the recirculation passage 71 by means of the chamber 72 and thus it is possible to equalize the exhaust mixture gas mixed in the main flow (the air) in the circumferential direction.

Further, from the exhaust mixture gas introduced into the annular chamber 72, impurities such as oil and soot contained therein can be removed and collected in a downstream section m. As a result, it is possible to suppress the performance decline due to contamination of the compressor 1.

Furthermore, the collected impurities flow along the annular chamber and downward in a direction of gravitational force. The impurities are ultimately collected at the time of regular maintenance and the like.

(Third Embodiment)

Figure 4:
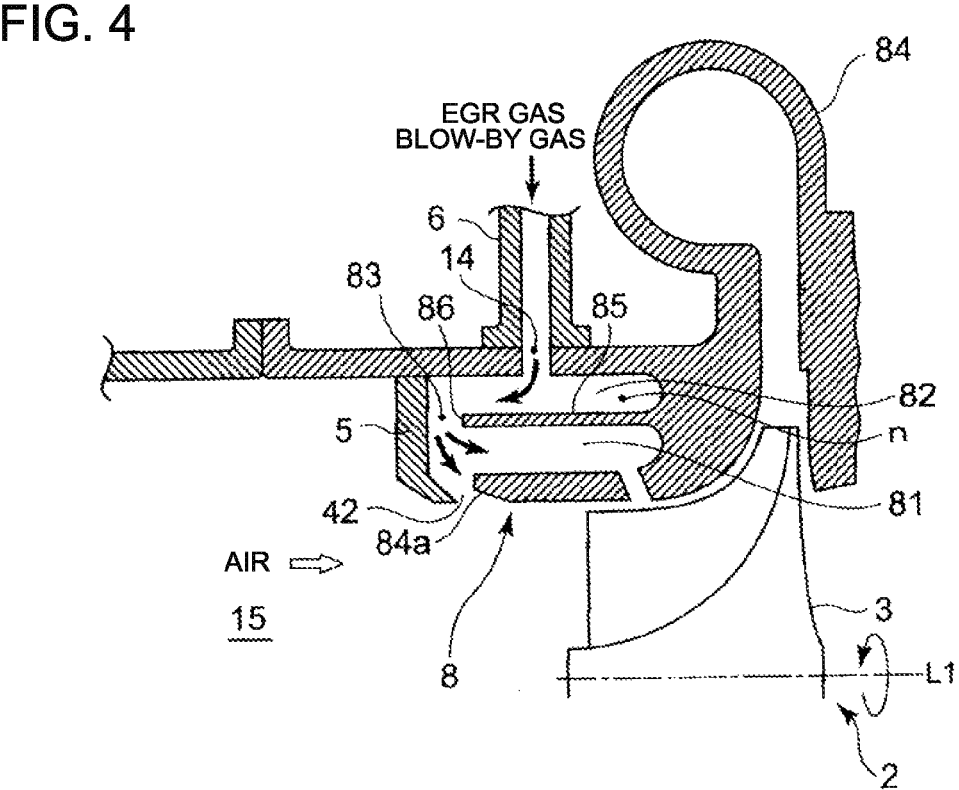
FIG. 4 is a view corresponding to FIG. 1 according to a third embodiment of the present invention.

In the following embodiment, components already described with reference to the first embodiment are denoted by the same reference numerals, and thus detailed description thereof will be hereinafter omitted. FIG. 4 is an enlarged sectional view of the rotation shaft of the compressor impeller showing a main section of an upper half thereof according to the third embodiment of the present invention.

A casing treatment 8 is formed with a recirculation passage 81 and a chamber 82. The recirculation passage 81 is annularly formed at an outer circumferential section of the compressor impeller 3 inside an outer wall forming the air passage 15. The recirculation passage 81 is formed on the outer circumferential side of the compressor impeller 3 and the annular chamber 82 is formed on an outer side of the recirculation passage 81 to lay over the recirculation passage 81.

The communication passage 83 connecting the recirculation passage 81 and the chamber 82 in communication is formed by the recirculation passage forming member 5 and a leading edge 86 of a partition wall 85 for separating the recirculation passage 81 and the chamber 82. The first recirculation opening 42 of the recirculation passage 81 is formed by the inner circumferential surface 5b of the leading edge of the recirculation passage forming member 5 and an inner surface 84a of a compressor housing 84.

A plurality of the communication passages 83 may be formed annularly along the recirculation passage 81 and the chamber 82 at equal intervals or the communication passage 83 of slit-like shape may be formed annularly along the recirculation passage 81 and the chamber 82.

At an outer periphery of the chamber 82, the return opening 14 is formed for introducing the exhaust mixture gas to a middle section in a direction of the air passage 15 via the mixing pipe 6.

The exhaust mixture gas introduced by the mixing pipe 6 flows in the annular chamber 82 along the outer circumference of the air passage 15 and spreads throughout the chamber 82.

The rest of the structure is substantially the same as the first embodiment and thus not further explained.

According to the third embodiment, the chamber 82 is formed inside the outer wall forming the air passage 15 and thus the exhaust gas turbocharger becomes compact, thereby improving installability of the exhaust gas turbocharger to the engine.

Further, the exhaust mixture gas is introduced from the mixing pipe 6 and directed to the partition wall 85 separating the recirculation passage 81 and the chamber 82 so that the introduced exhaust mixture gas hits the partition wall 85, and impurities such as oil and soot contained in the exhaust mixture gas is removed and collected in a downstream section n inside the chamber 82. As a result, it is possible to suppress the performance decline due to contamination of the compressor 1.

(Fourth Embodiment)

In the following embodiment, components already described with reference to the first embodiment are denoted by the same reference numerals, and thus detailed description thereof will be hereinafter omitted.

Figure 5:
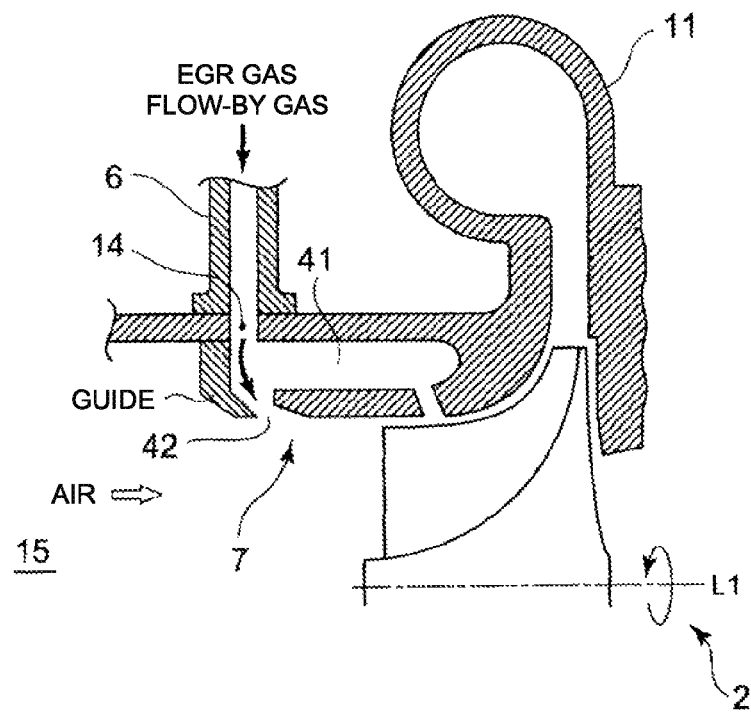
FIG. 5 is a view corresponding to FIG. 1 according to a fourth embodiment of the present invention.

FIG. 5 is an enlarged sectional view of the rotation shaft of the compressor impeller showing a main section of an upper half thereof according to the fourth embodiment of the present invention.

The mixing pipe 6 for introducing the exhaust mixture gas to the recirculation passage 41, the return opening 14 and the first recirculation opening 42 are arranged approximately perpendicular to the axial line L1 of the turbine rotor 2 and approximately in the same straight line.

The rest of the structure is substantially the same as the first embodiment and thus not further explained.

According to the fourth embodiment, at the small flow rate (when the output of the engine is medium or low), which is a frequent case, it is possible to smoothen the flow of the exhaust mixture gas and also to smoothen joining of the exhaust mixture into the main flow (the air) in the air passage 15. As a result, the pressure loss is reduced and the performance of the exhaust gas turbocharger is maintained.

(Fifth Embodiment)

In the following embodiment, components already described with reference to the first and second embodiments are denoted by the same reference numerals, and thus detailed description thereof will be hereinafter omitted.

Figure 6:
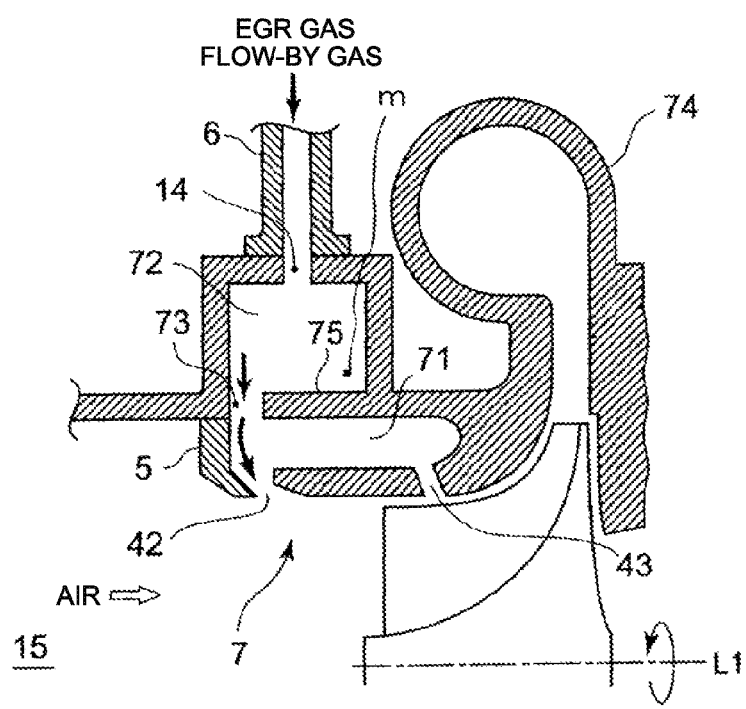
FIG. 6 is a view corresponding to FIG. 1 according to a fifth embodiment of the present invention.

FIG. 6 is an enlarged sectional view of the rotation shaft of the compressor impeller showing a main section of an upper half thereof according to the fifth embodiment of the present invention.

The drawing shows the casing treatment 7, the second recirculation opening connecting the recirculation passage 71 and the air passage 15 of the outer circumferential part of the compressor impeller 3, the first recirculation opening connecting an outlet side of the recirculation passage 71 and the air passage 15 at an inlet of the compressor impeller 3.

Further, the annular chamber 72 is formed on an outer circumferential side of the annular recirculation passage 71. The annular chamber 72 projects outward from the outer circumferential wall forming the air passage 15 in a rectangular shape in cross section.

The recirculation passage 71 and the chamber 72 are in communication with each other via a communication passage 73. The communication passage 73 is formed on the outer periphery of the recirculation passage 71 at an upstream end in the direction of the air passage 15. The communication passage 73 and the first recirculation opening 42 may be substantially in the same straight line in a radial direction with respect to the axial line L1 of the turbine rotor 2.

Further, the mixing pipe 6 is arranged to the annular chamber 72 to introduce the exhaust mixture gas to a middle section in a direction the air flowing in the air passage 15.

A plurality of the communication passages 73 may be formed along the annular recirculation passage 71 at equal intervals or the communication passage 73 of slit-like shape may be formed along the annular recirculation passage 71.

The rest of the structure is substantially the same as the first embodiment and thus not further explained.

According to the fifth embodiment, by communication the communication passage 71 and the chamber 72 via the communication passage 73, the exhaust mixture gas is further equalized in the recirculation passage 71 by means of the chamber 72 and thus it is possible to equalize the exhaust mixture gas mixed in the main flow (the air) in the circumferential direction.

Further, from the exhaust mixture gas introduced into the annular chamber 72, impurities such as oil and soot contained therein can be removed and collected in the downstream section m inside the chamber 72. As a result, it is possible to suppress the performance decline due to contamination of the compressor 1.

Furthermore, at the small flow rate (when the output of the engine is medium or low), which is a frequent case, it is possible to smoothen the flow of the exhaust mixture gas in the chamber 72 and the recirculation passage 71 and also to smoothen joining of the exhaust mixture into the main flow (the air) in the air passage 15. As a result, the pressure loss is reduced and the performance of the exhaust gas turbocharger is maintained.

(Sixth Embodiment)

In the following embodiment, components already described with reference to the first and second embodiments are denoted by the same reference numerals, and thus detailed description thereof will be hereinafter omitted.

Figure 7:
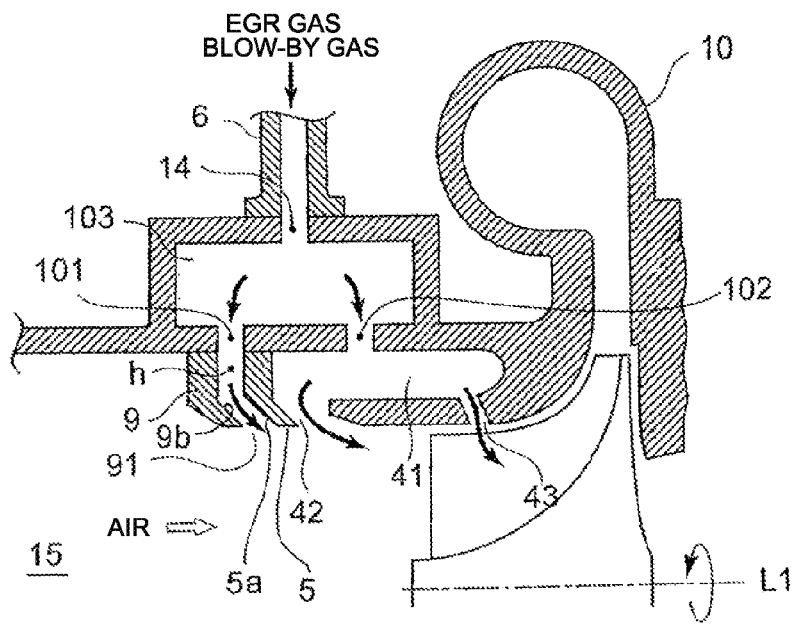
FIG. 7 is a view corresponding to FIG. 1 according to a sixth embodiment of the present invention.
Figure 8:
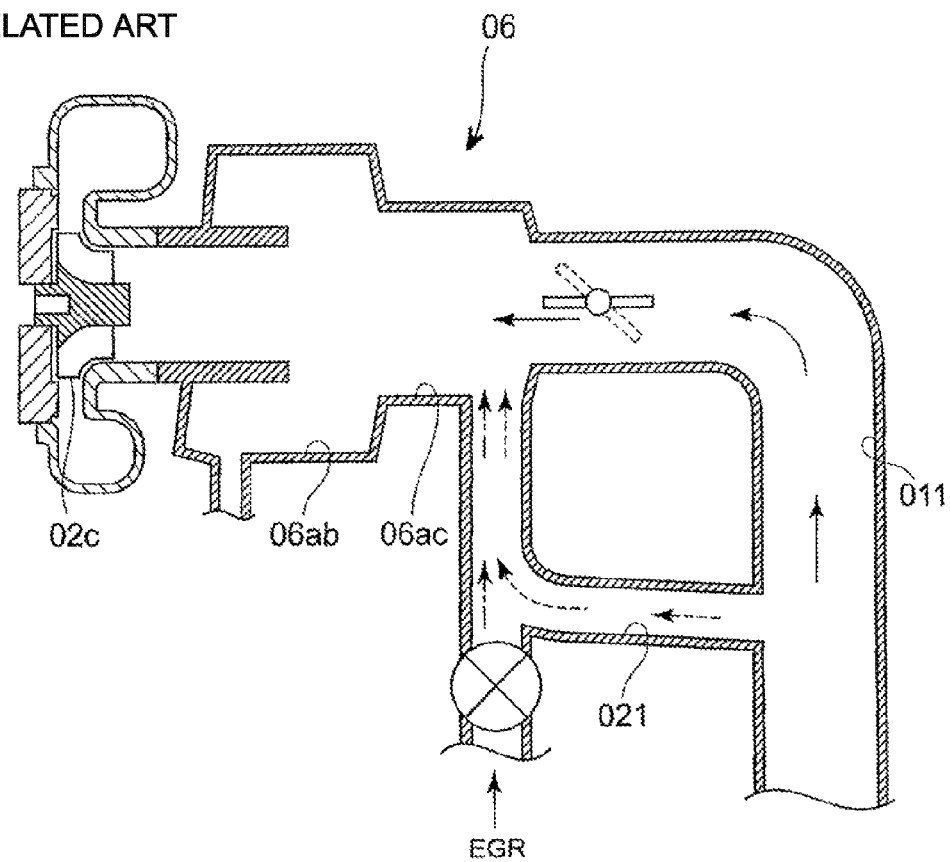
FIG. 8 is a view of a main section of an exhaust recirculation system of related art.

FIG. 7 is an enlarged sectional view of the rotation shaft of the compressor impeller showing a main section of an upper half thereof according to the sixth embodiment of the present invention.

FIG. 7 shows a compressor housing 10, the air passage 15 formed at the inlet of the compressor impeller 3 inside the compressor housing 10.

FIG. 7 also shows the casing treatment 4 formed with the recirculation passage 41, the first recirculation opening 42 and the second recirculation opening 43.

A plurality of the first recirculation openings 42 and the second recirculation opening 43 may be arranged in the annular recirculation passage 41 at equal intervals along the circumferential direction or the first recirculation opening 42 and the second recirculation opening 43 of slit-like shape may be formed along the circumferential direction. The recirculation passage 41 includes the annular recirculation-passage forming member 5.

An annular guide member 9 formed with a third recirculation opening is attached on an upstream side of the recirculation passage forming member 5 in the air passage. The third recirculation opening is arranged with a distance h from the recirculation passage forming member 5 and introduces the exhaust mixture gas into the air passage 15.

An exhaust mixture gas introduction port 91 is formed with the outer circumferential guide surface 5a and an inner circumferential surface 9b of the guide member 9 opposing the outer circumferential guide surface 5a. To the exhaust mixture gas introduction port 91, the exhaust mixture gas is introduced from return opening 14 to the main flow (the air) of the air passage 15. The outer circumferential guide surface 5a is formed on a surface of the recirculation passage forming member 5, facing the air passage 15.

The exhaust mixture gas introduction port 91 is formed with an annular passage (the exhaust mixture gas introduction port 91) on the inner circumferential surface 9b on a leading edge side of the guide member 9.

A plurality of the exhaust mixture gas introduction ports 91 may be arranged at equal intervals in the circumferential direction of the annular guide member 9 or the exhaust mixture gas introduction port 91 of slit-like shape may be formed in the circumferential direction.

An annular chamber 103 is formed outward from the outer circumferential wall forming the air passage 15 on the outer periphery of the guide member 9. The annular chamber 103 includes a first communication passage 101 in communication with the exhaust mixture gas introduction port 91 and a second communication passage 102 in communication with the recirculation passage 41.

At an outer periphery of the annular chamber 103, the return opening 14 and the mixing pipe 6 connected to the return opening 14 are connected to a middle section in the direction of the air flowing in the air passage 15.

According to this embodiment, the exhaust mixture gas introduced to the annular chamber 103 spreads throughout the chamber 103 along the outer circumference of the air passage and enters the air passage 15 evenly from the entire circumference of the exhaust mixture gas introduction port 91.

Therefore, the exhaust mixture gas can be introduced from the first recirculation opening 42 and the exhaust mixture gas introduction port 91 arranged upstream of the compressor impeller 3 in the casing treatment 4 and then mixed smoothly to the main flow (the air).

Furthermore, at the small flow rate (when the output of the engine is low), the exhaust mixture gas introduced to the chamber 103 from the mixing pipe 6 is introduced to the exhaust mixture gas introduction port 91 from the first communication passage 101, and to the recirculation passage 41 from the second communication passage 102 and then into the air passage 15 from the first recirculation opening 42 of the recirculation passage 41.

At a high flow rate (when the output of the engine is high), the air flows in the air passage 15 at a high speed and the pressure inside the compressor impeller 3 decreases. Thus the exhaust mixture gas in the recirculation passage 41 is drawn into the compressor impeller 3 from the second recirculation opening 43 of the recirculation passage 41.

Therefore, it is possible to provide a positive measure against NOx without experience shortage of EGR gas even at a high flow rate.

[Industrial Applicability]

In order to achieve reduction of NOx contained in the exhaust gas of an internal combustion engine using the exhaust gas turbocharger, the present invention is applicable to an exhaust gas turbocharger for performing exhaust emission control of NOx by recirculating the exhaust gas to a compressor upstream side to recirculate the exhaust gas to the internal combustion engine.

The invention claimed is:

1. A housing structure for an exhaust gas turbocharger whose compressor impeller is housed in the housing structure, comprising:
   a casing treatment including a recirculation passage which is annularly formed around a blade of the compressor impeller, the recirculation passage having a first recirculation opening and a second recirculation opening in communication with each other, the first recirculation opening being formed inside the housing and opening to an air passage upstream of the blade of the compressor impeller, the second recirculation opening being formed in the air passage around the blade of the compressor impeller;
   a mixing pipe having a return opening configured to allow at least one of EGR gas and blow-by gas to flow out; and
   a chamber provided in communication with the mixing pipe via the return opening and in direct communication with the recirculation passage of the casing treatment via a communication passage so as to be configured to communicate the chamber with the air passage via the recirculation passage, the chamber having a partition wall opposed to the return opening.

2. The housing structure for the exhaust gas turbocharger according to claim 1,
wherein the first recirculation opening and the communication passage are arranged along a radial direction of the compressor impeller so as to smoothly introduce the EGR gas or the blow-by gas to the air passage.

3. The housing structure for the exhaust gas turbocharger according to claim 1, further comprising:
a third recirculation opening provided in communication with the chamber and having an opening part on an upstream side of the first recirculation opening in the air passage, the opening part being disposed approximately parallel to the first recirculation opening and inclining toward a leading edge of the blade of the compressor impeller.

4. The housing structure for the exhaust gas turbocharger according to claim 1,
wherein the first recirculation opening is defined by an inner circumferential surface of an upstream side and an inner circumferential surface of a downstream side, and
wherein both of the inner circumferential surface of the upstream side and the inner circumferential surface of the downstream side incline toward a leading edge of the blade of the compressor impeller.

5. A housing structure for the exhaust gas turbocharger whose compressor impeller is housed in the housing structure, comprising:

a casing treatment including a recirculation passage which is annularly formed around a blade of the compressor impeller, the recirculation passage having a first recirculation opening and a second recirculation opening in communication with each other, the first recirculation opening being formed inside the housing and opening to an air passage upstream of the blade of the compressor impeller, the second recirculation opening being formed in the air passage around the blade of the compressor impeller;

a mixing pipe having a return opening configured to allow at least one of EGR gas and blow-by gas to flow out; and a chamber provided in communication with the mixing pipe via the return opening and with the recirculation passage of the casing treatment via a communication passage and having a partition wall opposed to the return opening, wherein the first recirculation opening and the communication passage are arranged along a radial direction of the compressor impeller and the first recirculation opening is aligned with the communication passage in the radial direction so as to smoothly introduce the EGR gas or the blow-by gas to the air passage.

* * * * *